United States Patent [19]

Purtschert

[11] Patent Number: 4,762,536
[45] Date of Patent: Aug. 9, 1988

[54] ADSORBER FOR CLEANING GASES

[75] Inventor: Werner Purtschert, Winterthur, Switzerland

[73] Assignee: Sulzer Brothers Limited, Winterthur, Switzerland

[21] Appl. No.: 918,781

[22] Filed: Oct. 14, 1986

Related U.S. Application Data

[63] Continuation of Ser. No. 763,928, Aug. 8, 1985, abandoned.

[30] Foreign Application Priority Data

Aug. 13, 1984 [CH] Switzerland .................... 3877/84

[51] Int. Cl.$^4$ ............................................. B01D 53/04
[52] U.S. Cl. ............................................. 55/66; 55/74; 55/316
[58] Field of Search .................... 55/316, 74, 66, 75

[56] References Cited

U.S. PATENT DOCUMENTS

| | | | |
|---|---|---|---|
| 3,303,634 | 2/1967 | Berrian | 55/269 X |
| 3,313,309 | 4/1967 | Wang | 55/316 X |
| 3,555,787 | 1/1971 | Lustig | 55/316 X |
| 3,834,130 | 9/1974 | Bissada et al. | 55/316 |
| 4,050,237 | 9/1977 | Pall et al. | 55/498 X |
| 4,242,111 | 12/1980 | Arends et al. | 55/269 |
| 4,478,619 | 10/1984 | Arends et al. | 55/316 |

OTHER PUBLICATIONS

The Condensed Chemical Dictionary, eight edition, 1971, p. 753.

Primary Examiner—Charles Hart
Attorney, Agent, or Firm—Kenyon & Kenyon

[57] ABSTRACT

The adsorber for cleaning gases comprises an adsorbent packing which is formed of a number of adsorbent layers and fiber layers disposed in alternating contiguous relation. The adsorber is particularly suitable for removing oil aerosols which are present in a very low concentration in the gas passing through the adsorber. The adsorber layers may be made of a molecular sieve material or activated carbon. The fiber layers may be made of cotton wadding or glass wadding or spun rayon.

1 Claim, 1 Drawing Sheet

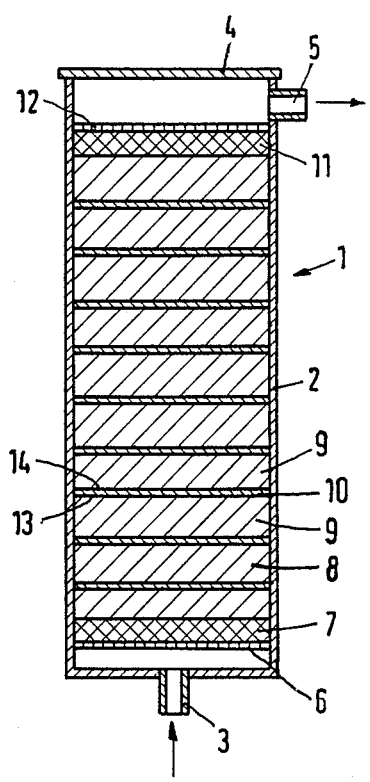

ADSORBER FOR CLEANING GASES

This is a continuation of application Ser. No. 763,928 filed Aug. 8, 1985, abandoned.

This invention relates to an adsorber for cleaning gases.

As is known, various types of adsorbers have been known for the cleaning of gases, for example, for the separation of oil vapor from the gases. In some cases, the adsorbers have been constructed so as to comprise a receptacle filled with an adsorbent packing which is able to separate out the oil vapor from a gas.

However, it has been found that the known adsorbers cannot separate oil aerosols which are present in gases at a very low concentration. This applies to aerosols of mineral oils and synthetic oils in a concentration range of approximately 0.1 parts per million (ppm). Hence, even with these small quantities of oil, over a long term, clogging of valves and other elements can occur. Further, thin layers of oil may accummulate on heat exchanger surfaces so that heat transfer is impaired. These disadvantages are particularly apparent in deep-temperature installations.

Accordingly, it is an object of the invention to provide an adsorber which is capable of separating out oil vapors and oil aerosols in very low concentrations.

It is another object of the invention to provide an adsorber of relatively simple construction which is able to adsorb oil aerosols at very low concentrations.

Briefly, the invention provides an adsorber for cleaning gases which is comprised is a receptacle which defines a flow path for a flow of gas and an adsorbent packing which is disposed in the receptacle and which includes a plurality of adsorbent layers and fiber layers. The adsorbent layers and fiber layers of the packing are arranged in alternating manner with the layers in contiguous relation. Further, the adsorbent layers may be made of a material such as a molecular sieve or activated carbon. The fiber layers may be formed of cotton wadding, glass wadding or spun rayon.

When in use, a flow of gas is directed through the adsorbent packing so that any oil vapor or oil aerosol contained in the gas may be adsorbed by the packing.

These and other objects and advantages of the invention will become more apparent from the following detailed description taken in conjunction with the accompanying drawings wherein;

The FIGURE illustrates a cross sectional view of an adsorber constructed in accordance with the invention.

Referring to the drawing, the adsorber 1 comprises a vertically disposed cylindrical receptacle 2 having an inlet in the form of a bottom connection 3 for receiving a flow of gas which is to be cleaned. In addition, the adsorber 1 is closed at the upper end by a cover 4 while an outlet in the form of a connection 5 extends from a sidewall below the cover 4 for the flow of cleaned gas. The cleaned gas may be delivered to any suitable place of use (not shown).

The adsorber 1 includes a perforate plate 6 near the bottom of the receptacle 2 on which a filter layer 7, for example, a fiber mat, is disposed. In addition, an adsorbent packing 8 is disposed on the filter layer 7 in the receptacle 2 between the inlet 3 and the outlet 5 for the cleaning of oil vapor and oil aerosols from the gas passing through the receptacle 2.

As indicated, the adsorbent packing 8 includes a plurality of alternating layers of adsorbent layers 9 and fiber layers 10. The adsorbent layers 9 are formed, for example, by a molecular sieve or activated carbon. The fiber layers 10 are in the form, for example, of cotton wadding or glass wadding or spun rayon.

A filter layer 11, for example in the form of a fiber mat, is also disposed at the upper end of the packing 8 while a perforate plate 12 is disposed above the fiber layer 11 to retain the adsorbent packing 8 at the top within the receptacle 2.

During operation, gas from which splashes and droplets have been removed in pre-separators (not shown) passes through the bottom connection 3 into the receptacle 2 of the adsorber 1 and flows upwardly through the packing 8 to issue through the outlet connection 5. As the gas passes through the packing 8, vapors or aerosols present in the gas are separated therefrom and adsorbed in the packing 8. This separation operation can be understood as a two-stage operation wherein the oil aerosols in the gas are initially collected and retained on a fiber layer 10, particularly in a very intensive manner near the contact surfaces 13, 14 between a fiber layer 10 and a contiguous adsorbent layer 9. Thereafter, the oil aerosols are adsorbed by capillary action into the two contiguous adsorbent layers 9 which are disposed on either side of the fiber layer 10. The adsorbent layers 9 also adsorb any oil vapors in the gas passing therethrough.

The invention thus provides a relatively simple adsorber construction which is capable of separating oil aerosols as well as oil vapors from a gas passing therethrough. In this respect, aerosols of mineral oils and synthetic oils in a concentration range of approximately 0.1 parts per million (ppm) can be separated.

EXAMPLE

1—Refrigerating apparatus.
2—Gas to be purified: heliumgas.
3—Pressure: 17 bar absolute.
4—Temperature: 25° C.
5—Massflow: 130 grams/s.
6—Gas superficial velocity: 0.1 m/s.
7—Impurity to be adsorbed: synthetic oil.
8—Concentration at entrance of adsorber: 0.12 ppm by mass.
9—Concentration at exit of adsorber: 0.0011 ppm by mass.

What is claimed is:

1. A method of cleaning a helium gas containing a synthetic oil aerosol in a concentration of 0.12 ppm, said method comprising the steps of
    passing a flow of the gas sequentially through a packing having a plurality of adsorbent layers and a plurality of fiber layers disposed in alternating and contiguous relation;
    collecting oil aerosols from the gas within each fiber layer;
    retaining the collected oil aerosols near a contact surface between a respective fiber layer and a contiguous adsorbent layer;
    adsorbing the oil aerosols from each fiber layer into a contiguous adsorbent layer under capillary action; and
    exhausting the gas from the packing with a concentration of the oil aerosol of 0.0011 ppm.

* * * * *